United States Patent Office 3,408,493
Patented Oct. 29, 1968

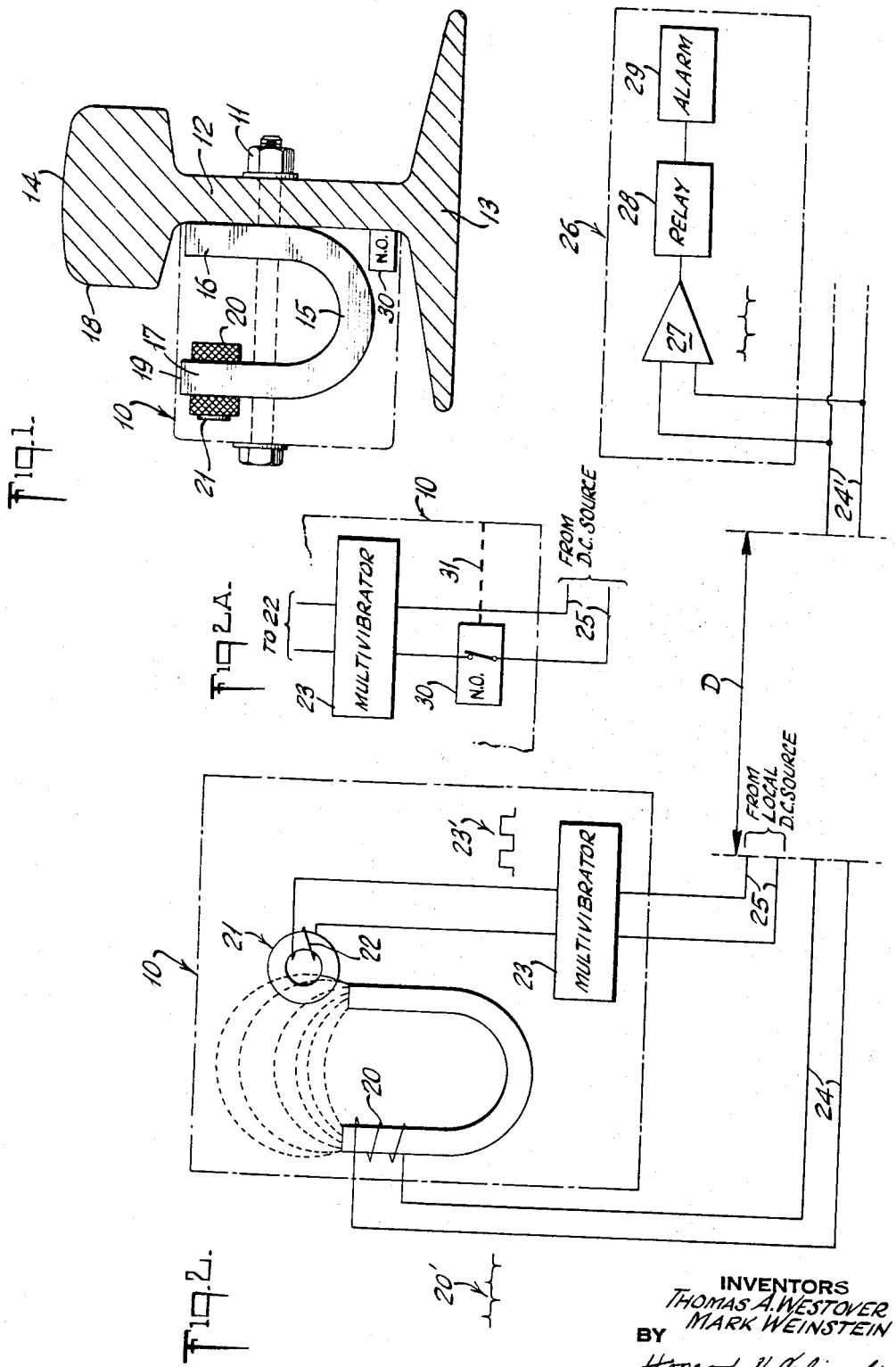

3,408,493
TRANSDUCER INTERROGATOR
Thomas A. Westover, Hempstead, and Mark Weinstein, Wantagh, N.Y., assignors to Servo Corporation of America, Hicksville, N.Y., a corporation of New York
Filed Dec. 13, 1966, Ser. No. 601,420
11 Claims. (Cl. 246—249)

This invention relates to means for continuously monitoring the operative condition of the magnetic circuit of a transducer which is intended to be continuously alert to detect the presence or absence of ferromagnetic objects in the response field of the magnetic circuit.

Transducer devices of the character indicated are now employed in railroading operations as electrical markers to identify the instant of time when a railroad wheel (being a ferromagnetic object) passes a location of interest along a length of railroad track. Conventionally, such detectors include a permanent-magnet core so configurated as to present a polarized air gap between spaced poles; the air gap is so positioned that its reluctance will be materially altered while a moving railroad wheel passes the transducer location. The electrical marker signal is developed by induction, through an output winding coupled to the core.

Although devices of the character indicated have proved themselves to be extremely rugged and reliable, the ultimate in reliability has yet to be achieved; and for unattended installations, it is important that signaling and/or maintenance personnel should be alerted as soon as the operating condition of the transducer is anything less than satisfactory.

It is, accordingly, an object of the invention to provide an improved magnetic presence-detector device with means for continuously monitoring the operative condition thereof.

Another object is to provide an automatic remote indicating device inherently capable of alerting for an unsatisfactory operating condition of a magnetic detection device of the character indicated.

It is a specific object to meet the foregoing objects in a railroad wheel trip, without increasing the connecting-cable requirements for remote transmission.

Another specific object is to incorporate the indicated monitoring feature in existing styles of magnetic wheel trips, without imposing any requirement for change in external dimensions or in appearance or in mounting techniques for applying the same to a railroad track.

It is a general object to meet foregoing objects with structure which is inherently simple and rugged, which requires no moving parts, which is capable of revealing the occurrence of any fault in the chain of functions which accounts for customary wheel-trip operation, and which is inherently fail-safe in its nature.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 1 is a simplified vertical sectional view of a railroad rail, supporting a magnetic-induction wheel trip incorporating the features of the invention; and FIG. 2 is a diagram schematically showing the interconnection of parts in a monitoring system of the invention, using a wheel trip as in FIG. 1; and FIG. 2A is a fragmentary diagram showing a modification of FIG. 2.

Briefly stated, the invention contemplates continuously monitoring the operative effectiveness of a magnetic detector which is normally intended to detect the presence of a body of ferromagnetic material. An important employment of such devices involves mounting to a length of railroad track to detect and identify the instant of time when a wheel passes the detector. Such detectors customarily employ a permanently magnetized core of magnetic flux-conducting material, so mounted to the rail that (a) an adjacent part of the rail head defines one pole of an air gap, and (b) an outer leg of the core defines the other pole. Such wheel trips thus establish a polarized air gap, the reluctance of which is modified by the presence or absence of passing wheels; in some cases, the wheel flange is the primary part relied upon to change the reluctance of the air gap and, in other situations, the outer edge of the wheel or tire is so employed. In any event, an electric output coil linked to the core is utilized to develop an electrical output pulse.

The specific monitoring function of the invention is accomplished by a small saturable reactor element fixedly located in part of the field of the wheel trip, and this reactor is periodically excited and de-energized so as to establish a known time sequence of effectively inserting and removing a small magnet with respect to the normal magnetic field of the wheel trip. Normal operation of the wheel trip is remotely detectable because the wheel-trip output reflects the periodic saturation of the reactor, and failure to remotely detect this expected output signifies an unsatisfactory wheel-trip condition, causing an alert for necessary maintenance.

Referring to the drawings, the invention is shown in application to a magnetic wheel-trip device designated generally 10, affixed as by through-bolt means 11 to the web 12 joining the flat base 13 and head 14 of a standard railroad track section or rail.

The wheel trip comprises a permanently magnetized core element which happens to be shown as a horseshoe or U-shape 15 with one leg 16 adjacent the rail section and with a second leg 17 spaced laterally away from the rail section. The nature of the relation of leg 16 to the rail section which, of course, is of ferromagnetic material, is such as to cause the part 18 of the rail head to become one pole of a polarized air gap which extends between the pole 18 and the outer end or pole 19 of the core 15. A coil 20 is linked to a part of the core 15, so that movement of a ferromagnetic object in the vicinity of the polarized air gap will vary the reluctance thereof and thus generate a corresponding output, for signal or synchronizing purposes.

It is customary in devices of the character indicated to have all the described parts of the magnetic and electrical circuits encased in a solid potting of non-magnetic, non-conducting material. The result is an elongated prismatic structure which (for the viewing aspect of FIG. 1) will have generally the outline designated in phantom and identified by the numeral 10.

In accordance with a feature of the invention, we incorporate into the potted structure, within the confines 10, a monitoring device which for want of a better word can be called an interrogator, serving the purpose of repeatedly interrogating the described wheel trip to check upon its operating efficiency. The interrogation is accomplished without moving parts and solely by operating upon the magnetic field structure associated with the described wheel trip. The basic interrogating element may comprise a saturable reactor element 21 electrically insulated from but physically fixed with respect to and preferably on the outer periphery of the output coil 20. This general location is schematically indicated in FIG. 1.

In FIG. 2, the saturable reactor is seen preferably to comprise an annular core of readily saturable magnetic material. Such a core may for example be produced as a helical development of a metal ribbon having the indicated characteristics, and in actual practice we have found a commercial material by the trade name Supermalloy of 0.002-in. thickness to be highly satisfactory. The general overall size of the annular core of reactor 21 may be in the order of ⅛-in. width, ⅛-in. radial thickness, and 0.6-in. diameter. It is toroidally wound with an input or excitation winding 22, and as suggested in FIG. 1, the complete wound reactor is preferably secured flat against the outer periphery of the output coil 20. The reactor 21 may thus be said to be located fixedly within a part of the magnetic field associated with the described wheel-trip structure.

The invention contemplates effectively inserting and removing the magnetic material of the reactor 21 on a programmed basis, which may be regularly periodic, the insertion and removal being effective with respect to the field associated with the wheel trip. Such effective insertion and removal is achieved in the form shown by a flip-flop signal generator which may be bi-stable multivibrator 23 operated from a local D-C supply and having components selected for ruggedness and reliability. The multivibrator 23 may be contained within the potting 10, and its output is a square wave suggested by the fragmentary waveshape 23' in FIG. 2. The multivibrator output 23 is shown directly connected to the reactor input winding 22, and the voltage-level shift involved in the square wave 23' is selected so as alternately to excite the reactor 21 to its saturated and unsaturated states.

As far as the output winding 20 is concerned, the sequence of saturated and unsaturated states of reactor 21 will impress a slight modulation on the normal magnetic field associated with the wheel-trip structure, and in the form shown the modulation is effected at that part of the field which surrounds the outer periphery of the coil 20. The output winding 20 reflects this modulation as a differentiation of the square wave 23', said differentiation being suggested by waveform 20' in FIG. 2. Preferably, the excitation level of reactor 20 and its physical dimensions are so selected that the square-wave modulation on the magnetic field represents but a very small fraction of any modulation attributable to a passing railroad wheel. For example, the voltage-output excursions represented by the signal 20' are in the order of one-half of one percent of the normal expected voltage-pulse development at winding 20 for a passing railroad wheel.

It will be appreciated that the monitoring voltage signal 20' and the normal wheel trip wheel-identifying pulse output may both appear without ambiguity across the same output leads 24 for the winding 20. Customarily, these leads are brought to a junction box at a wayside cabinet or shed, in the vicinity of the attachment of the wheel trip to the rail. The local D-C supply for lines 25 to the multivibrator 23 may be available in the same cabinet so that a single cable with four conductors will suffice for input and output purposes in serving the wheel trip 10.

For remote-monitoring purposes, it is necessary only to provide extension of the same two-conductor line 24, and this extension is identified 24' in FIG. 2, the remote distance being designated D. The monitoring station is shown generally within the phantom outline 26 served by the remote transmission line 24'. It comprises essentially a receiver equipment 27 which may be merely an amplifier optimized for the processing of the signal 20' attributable to the multivibrator 23; amplifier 27 may thus include a monostable multivibrator (not shown) triggered by one polarity of the received pulses 20'. Relay means 28 is continuously connected to the output of amplifier 27 and is so constituted that as long as an adequate output of the signal 20' is detected and amplified, then the relay 28 will hold its armature in the actuated state. Any failure or impaired performance resulting in degeneration of signal 20' below a predetermined threshold level is immediately noted by drop out of the relay armature, in which case an alarm circuit 29 may be positively operated to reveal this fact.

In actual use, we prefer to select the cycle of multivibrator 23 for a relatively low repetition rate, which may be in the order of one cycle per second. We do this in order to make sure that amplifier 27 can clearly exclude response to stray 60-c.p.s. signals which are often induced in remote-transmission lines. The preferred low-frequency rate also serves to exclude higher frequency signal components which may be induced magnetically due to other facets of railroad operation. Furthermore, the preferred low-frequency rate for operation of multivibrator 23 assures no ambiguity with any component of pulse development attributable to a passing wheel.

It will be seen that we have described a relatively simple configuration for assuring continuous monitoring of top performance of a wheel trip of the character indicated. The device is essentially fail-safe in nature, in that power failure, breakage (of a cable or of a coil), magnetic shorting, receiver malfunction, and like occurrences result in an immediate indication of less than an adequate system.

Preferably, the potted trip assembly 10 includes interlock means such as a normally-open limit switch 30 in series with the connection to one of the coils 20–21, being shown in series with supply 25 to flip-flop or multivibrator 23 forming part of the supply to coil 20, to assure continuity of the leads 25 from assembly 10 as long as the latter remains properly mounted to the rail section 12. Thus, as long as the probe or actuator element 31 of switch 30 is held firmly against web 2, switch 30 will have been actuated to closed position (the condition suggested in FIG. 2A), but when the assembly 10 for some reason is loosened from its connection to web 12, switch 30 is no longer pressed against web 12 and will operate to its normally open position, in which event the alarm condition is remotely indicated.

Although the invention has been described in detail for the preferred form illustrated, it will be understood that modifications may be made within the scope of the invention as defined in the claims which follow.

We claim:

1. In combination, an electromagnetic transducer comprising a permanently magnetized circuit including a core of magnetic flux-conducting material and spaced poles defining an air gap, an output electric winding coupled to a part of said core, whereby said winding will develop an output voltage for reluctance changes in said circuit, a saturable reactor fixed in the vicinity of said gap and including an input electric excitation winding, said reactor being oriented to so that its magnetic field will change the reluctance of said circuit upon excitation of said input winding, a source of varying voltage connected to said input winding to change the condition of said reactor between saturated and unsaturated states, and means continuously monitoring the output-winding voltage for a signal reflecting voltage variations of said source, whereby the operative condition of said transducer to respond to an unknown variation in the reluctance of said circuit may be continuously established.

2. In combination, a length of railroad track including a rail of ferromagnetic material having a base portion connected by a web to a head portion, an electromagnetic wheel-detection transducer fixed alongside one face of the web and between the head and base portions of said rail and comprising a permanently magnetized circuit including a core of magnetic flux-conducting material, said circuit including a head portion of said rail at one pole and establishing another pole laterally spaced from said rail and defining between said poles a polarized air gap, an output electrical winding coupled to a part of said core, whereby said winding will develop an output voltage for such reluctance changes as occur in said circuit for passage of a ferromagnetic wheel along the rail in the vicinity of said transducer, a saturable reactor fixed in relation to said circuit and winding and located in a part of the magnetic field associated therewith, and excitation signal supply means including a flip-flop circuit connected to the input winding of said saturable reactor, whereby the operative state of said transducer may be continuously monitored by observing voltage components in the output winding reflecting known flip-flop operation characteristics.

3. The combination of claim 2, in which said flip-flop is a bi-stable multivibrator.

4. The combination of claim 2, in which said saturable reactor is mounted adjacent a part of the periphery of said output winding.

5. The combination of claim 2, in which said core includes an outer upstanding leg terminating in said second-mentioned pole and in which said output winding is carried by said outer leg, the saturable reactor being fixed to a part of the periphery of said coil and in electrically insulated relation therewith.

6. The combination of claim 2, in which said transducer core, said output winding, said saturable reactor, and said flip-flop circuit are all encased in a permanent potting of non-magnetic electrically-insulating material.

7. Means for remotely monitoring the operative condition of a magnetic-induction wheel trip mounted along a length of railroad track, said wheel trip including a permanently magnetized core establishing an air gap between spaced poles and having an output electrical winding coupled to said core, said monitoring means comprising a saturable reactor fixedly supported in a part of the magnetic field associated with said wheel trip, an excitation source for said reactor and located immediately adjacent the same, said source including a flip-flop circuit for periodically exciting the reactor between saturable and unsaturable states, and a remotely located monitoring station connected to the output winding of said transducer and including amplifier means responsive to the flip-flop repetition frequency.

8. The combination of claim 7, and including at the monitoring station relay means continuously connected to the output of said amplifier means, said relay means being operative to hold a first state for amplifier output exceeding a predetermined threshold and to revert to a second state upon a drop of amplifier output below threshold, whereby failure of said amplifier means to continuously receive adequate transducer-output signals reflecting flip-flop operation will result in a change to the second state of said relay means.

9. The combination of claim 6, in which the assembly which is potted together includes as a rigidly supported part thereof an element responsive to the condition whether or not said transducer remains fixed to the rail, and connections to one of said windings including contacts set by the response of said last-mentioned element.

10. The combination of claim 9, in which said contacts are of the normally open variety, being operated to closed position via said element as long as said transducer remains fixed to the rail.

11. The combination of claim 9, in which said contacts are in series with the excitation supply to said flip-flop circuit.

References Cited
UNITED STATES PATENTS 3,205,352    9/1965    Prucha _____ 246—249 XR
3,235,723    2/1966    Pelino.

ARTHUR L. LA POINT, *Primary Examiner.*

S. T. KRAWCZEWICZ, *Assistant Examiner.*

PO-1050
(5/69)

UNITED STATES PATENT OFFICE
CERTIFICATE OF CORRECTION

Patent No. 3,408,493      Dated October 29, 1968

Inventor(s) Thomas A. Westover and Mark Weinstein

It is certified that error appears in the above-identified patent and that said Letters Patent are hereby corrected as shown below:

Col. 4, line 48 (Claim 1)
after "oriented", delete "to" and insert
--with respect to said circuit--.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents